United States Patent [19]

Manson et al.

[11] Patent Number: 5,341,840

[45] Date of Patent: Aug. 30, 1994

[54] BONNETLESS SWING CHECK VALVE

[75] Inventors: Ronald J. Manson, The Woodlands; Charles C. Partridge, Houston, both of Tex.

[73] Assignee: Tom Wheatley Valve Company, Houston, Tex.

[21] Appl. No.: 150,999

[22] Filed: Nov. 12, 1993

[51] Int. Cl.⁵ .............................................. F16K 15/03
[52] U.S. Cl. .................................. 137/527.8; 137/904
[58] Field of Search ................... 137/527.6, 527.8, 904

[56] References Cited

U.S. PATENT DOCUMENTS

| | | | |
|---|---|---|---|
| 2,454,072 | 11/1948 | Long | 137/527.8 X |
| 3,144,876 | 8/1964 | Frye | 137/527.8 X |
| 3,934,608 | 1/1976 | Guyton | 137/527.8 |

*Primary Examiner*—Robert G. Nilson
*Attorney, Agent, or Firm*—Marvin J. Marnock

[57] ABSTRACT

A swing-type check valve (10) having a bonnetless two-piece valve body (12, 14) with a valve chamber (22) and inlet and outlet ports (15, 21) defining a flow passage through the valve. A clapper (25) fixed to a clapper shaft (28) is restrained in working location by the two valve body members as mated in assembly and is adapted for pivotal movement between a valve open position and a valve closed position. A planar valve sealing surface (23) is provided on the end of one of the valve body members and positioned in the valve chamber in a location where it is protected from erosion from flow through the valve and adapted to be sealingly engaged by the clapper element (25). Guide ribs (40) are formed in the valve body for guiding the clapper (25) in movement between its valve open and valve closed positions so as to insure a seal by the valve clapper (25) when in its valve closed position irrespective of the orientation of the valve.

6 Claims, 2 Drawing Sheets

BONNETLESS SWING CHECK VALVE

FIELD OF THE INVENTION

This invention relates to a check valve for use in pipelines or the like, and more particularly to a swing-type check valve having a bonnetless two-piece valve body and a valve clapper element which is restrained in its working position by the two valve body members, a valve seal mounted on one end of one of the valve body members in a position where it is protected from erosion due to flow through the valve, and guide ribs in the valve body for guiding movement of the clapper element to insure a seal in its valve closed position irrespective of the orientation of the valve.

BACKGROUND OF THE INVENTION

Swing check valves typically include a clapper valve element which is pivotally mounted or hinged for swinging movement inside a valve housing. Most often, the clapper is fixed on a shaft which is mounted for axial rotation in the valve housing. The shaft may be mounted on the housing itself or on an insert or removable hanger provided in the housing. The valves are conventionally provided with a bonnet which is removeably mounted on the valve housing and covers a bonnet opening which provides access to the valve internals. Such valves require relatively complex manufacturing and assembly procedures and their clapper hanger mechanisms do not always insure that the clapper will maintain proper alignment to effect a seal during operation of the check valve when the valve is in a non-vertical orientation.

SUMMARY OF THE INVENTION

The invention is a swing check valve comprising a bonnetless two-piece valve body which includes a clapper valve element fixed to an axially rotatable clapper shaft and restrained in its working location by the two valve body members as mated in assembly. The valve body includes a tailpiece section threadedly connected to a larger valve body member which defines a valve chamber therein. The tailpiece section extends into the valve chamber and a planar valve sealing surface is provided on the end of the tailpiece section in a location where it is protected from erosion which might be incurred from flow through the valve. The valve sealing surface is also located where it is adapted to be sealingly engaged by the clapper when in its valve close position. Guide ribs are also provided in the chamber wall of the valve body to insure proper swinging movement of the clapper between its valve open and valve closed positions and thereby insure an engagement of the clapper with the planar valve sealing surface which will provide an effective seal in the valve closed position.

DETAILED DESCRIPTION OF THE INVENTION

Figure 1:
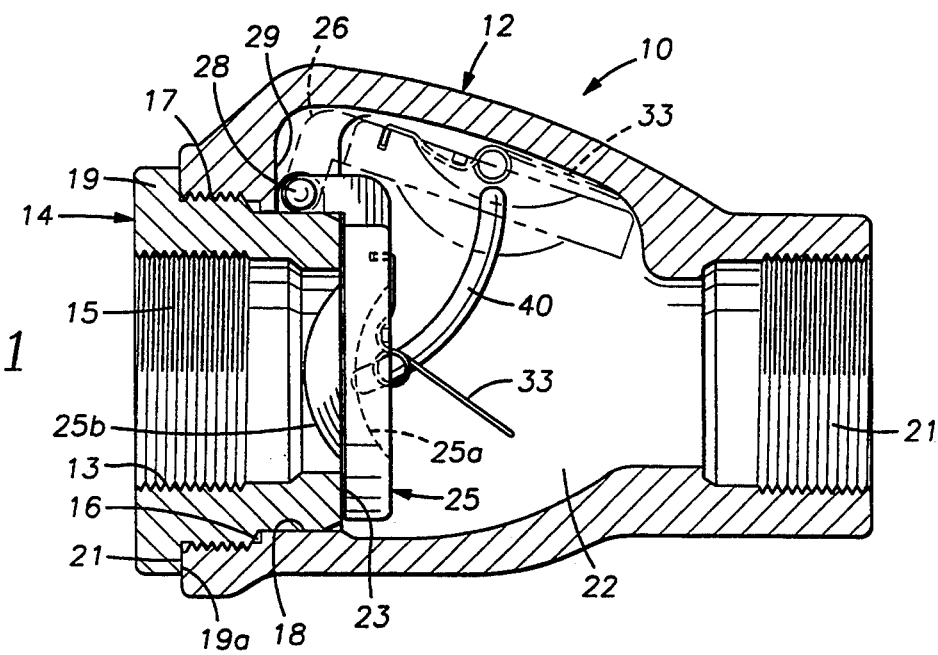
FIG. 1 is a vertical longitudinal section view of a bonnetless swing check valve representing a preferred embodiment of the invention.

Referring more particularly to the drawings, there is shown in longitudinal section in FIG. 1, a swing check valve 10 representing a preferred embodiment of the invention. The valve 10 is comprised of two piece valve body consisting of a main body section 12 and a tailpiece section 14, both of which are annular in transverse cross section, and threadedly connected to one another. The tailpiece section 14 is provided with an axial bore 15 with internal threads 13 at one end of the bore to facilitate its connection in a pipeline or the like. The tailpiece 14 is also provided with external threads 17 which engage internal threads in a bore 18 provided in one end of the body section 12. A seal ring 16, metallic or elastomer, is clamped between a bevelled shoulder of the tailpiece 14 and a radial shoulder in the bore 18 of the body section 12 to provide a fluid tight body seal. An external radial flange 19 on one end of the tailpiece 14 forms an annular shoulder 19a which engages the planar annular end surface 20 of the main body section to correctly orient the two valve body sections to one another.

The valve body section 12 is also provided at its other end with a bore 21 which has internal threads for accommodating connection in a pipeline. The bore 21 provides the outlet for the valve. A large central cavity in the body section 12 forms the valve chamber 22 which is in fluid communication with the valve inlet and outlet, and together therewith defines the flow passage through the valve.

The tailpiece section 14 extends into the valve chamber 22 and its end located in the valve chamber defines an annular surface 23 which can additionally be coated with corrosion resistant material, and provides a valve sealing surface. An annular groove 24a, coaxial with the central axis of the tailpiece section, is formed in the end surface 23 and accommodates an elastomer seal 24 such as an O-ring or other type annular seal which is received therein.

The valve 10 is also provided with a valve clapper 25 which is mounted for pivotal movement within the valve chamber 22 between a valve-open position as shown in dashed lines in FIG. 1 and a valve-closed position wherein the clapper engages the end of tailpiece 14 and the seal ring 24 to be in sealing relationship therewith.

The valve clapper 25 is in the general form of a circular disc with a clapper arm 26 integrally formed therewith at the perimeter of the disk and extending perpendicularly to the plane of the disk. A clapper pivot shaft 28 is fixed to the clapper arm and extends an equal distance from both sides of the clapper arm. The shaft 28 might be intregally formed with the clapper arm or fixed thereto in any suitable manner.

For mounting the shaft 28, the valve body section 12 is provided with a pair of side slots 34 in the inner wall thereof which provide retaining walls 31, 32 which extend inwardly from opposing inner side walls of the body section 12 in a direction towards and perpendicular to the central longitudinal axis of the valve. The side slots with retaining walls 31, 32 are spaced a distance from a transverse interior end wall section 29 of the chamber 22 and the top section of the chamber's inner wall to define a pocket or recess of a size to snugly receive the shaft 28 therein.

Figure 4:
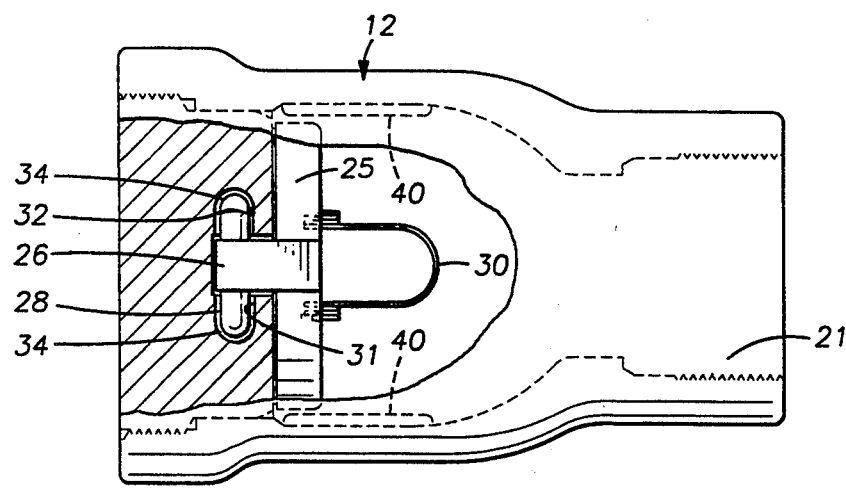
FIG. 4 is a fragmentary top plan view of the valve body of the valve of FIG. 1, with the tailpiece portion of the valve body removed to show mounting of the clapper arm of the valve.
Figure 5:
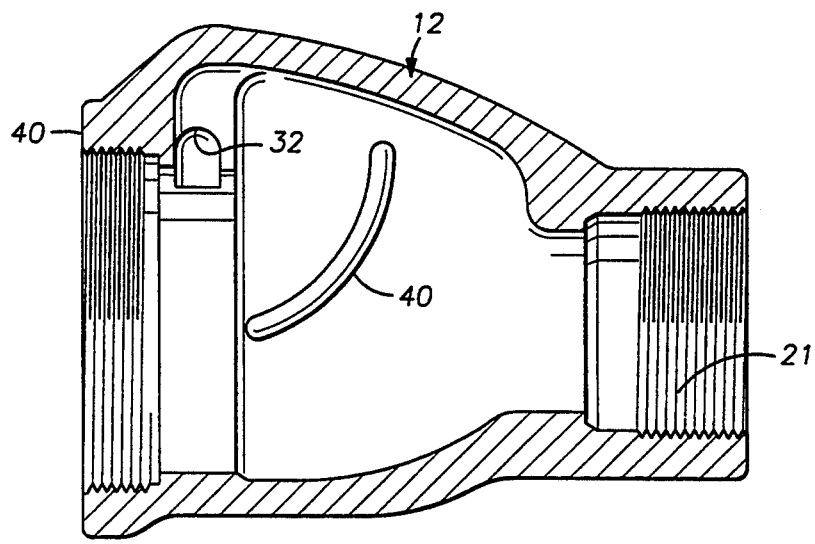
FIG. 5 is a view similar to FIG. 2, but with the valve clapper and tailpiece portion of the valve body removed to show a guide rib in the valve body.

The valve clapper 25 with clapper shaft attached is of a size to be easily insertable through the bore 18 of the body section 12 in the assembly of the valve. The clapper arm is placed in the gap between the retaining walls 31, 32 and the clapper shaft 28 located between the retaining walls and the end wall section 29 of the valve chamber as shown in FIG. 4. With tailpiece 14 fully connected to the body section 12, the external cylindrical surface of the tailpiece extends into the valve chamber below and closely adjacent the clapper shaft retaining walls 31, 32 to provide a resting surface for the clapper shaft. Although snugly received in the recess behind the retaining walls 31, 32 the shaft 28 is axially rotatable to allow swinging movement of the clapper.

The clearance between the top of the chamber inner wall and the clapper arm 26 is sufficiently small that, irrespective of the valve orientation, the valve clapper and shaft will be retained in operative position wherein the clapper shaft 28 is adapted for axial rotation in position behind the retaining walls and the clapper is free to swing in response to the flow of fluid through the valve.

It is also desirable for many applications to fit the valve clapper 25 with a spring 30 on the back side thereof such that the spring protects the valve clapper from collisions with the valve chamber wall should the clapper be suddenly swung to the valve open position by a sudden application of pressurized fluid through the valve. The spring 30 is formed from a single wire having both its ends 35, 36 clamped in side-by-side relation on the back surface of the valve clappers. The wire is formed with a central U-shaped section 33 and is coiled closely adjacent to its clamped ends to provide coils 33a, 33b in each leg of its U-shaped configuration.

The central U-shaped section 33 of the spring is angularly oriented with respect to the back surface of the valve clapper and is adapted to contact the top of the chamber wall when the valve clapper is in its full valve open position in which position the spring also biases the valve clapper towards the valve closed position in counteraction to a flow through the valve when either in the vertical or horizontal position. It is to be understood that the spring might have other forms than the form herein disclosed.

The clapper 25 is shown with a concavity 25a in the back surface to better accommodate the spring 30, although a planar surface could also be used. A corresponding convexity 25b is provided on the front of the clapper, but is entirely enclosed by the annular planar sealing surface of the clapper which is adapted for sealing engagement with the valve seal 24.

Figure 2:
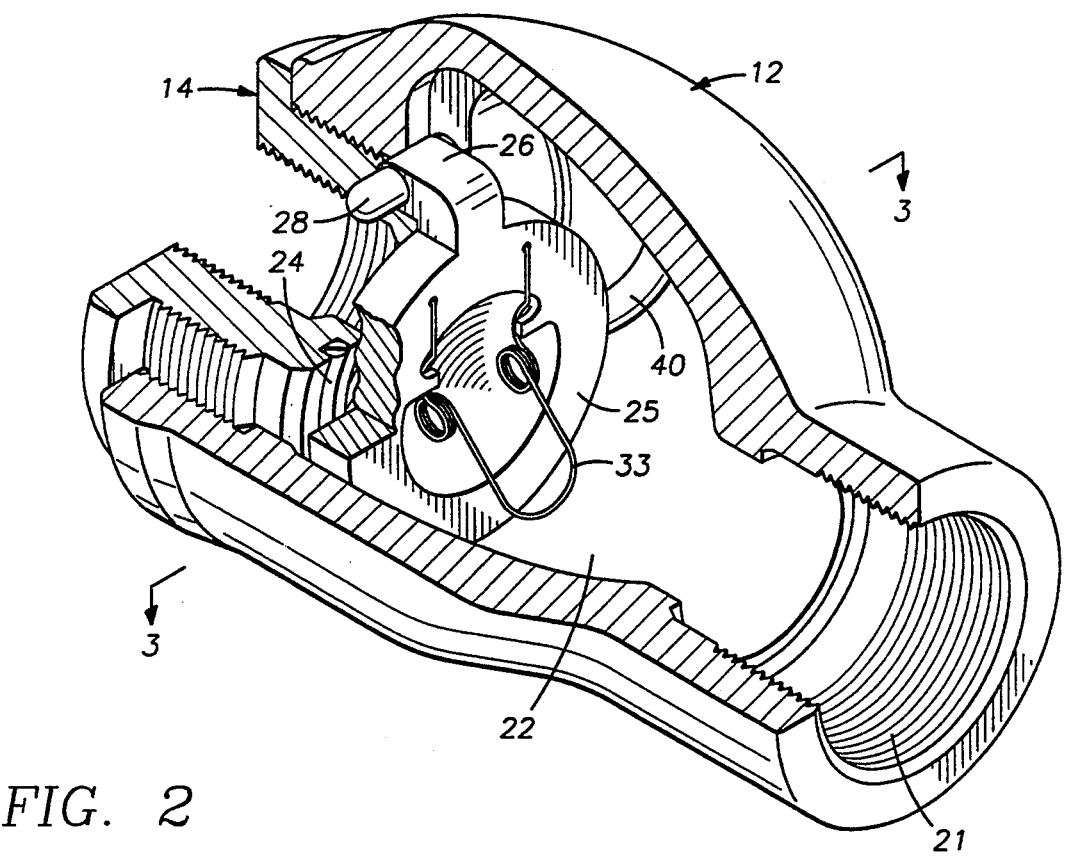
FIG. 2 is a perspective view of the valve of FIG. 1 with parts of the valve broken away, to show details of assembly.
Figure 3:
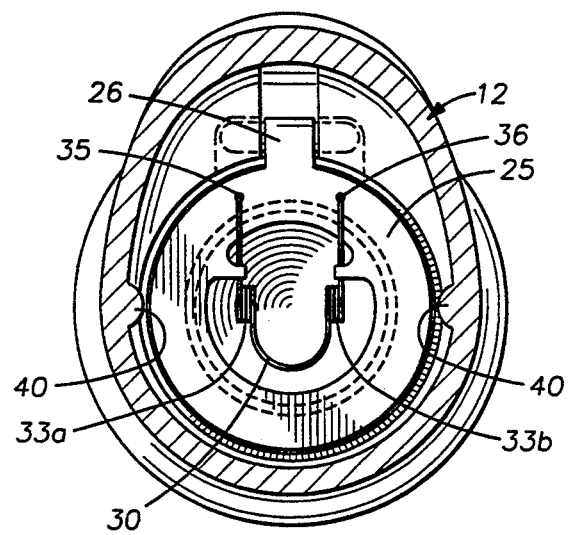
FIG. 3 is a section view perpendicular to the longitudinal axis of the valve body and the flow passage through the valve, as taken along the section line 3—3 in FIG. 1, and showing the valve clapper in the valve closed position.

It is to be appreciated that in many applications for swing check valves, the valve is not always installed or does not always remain in a vertical orientation wherein the clapper shaft is horizontal and the clapper is vertical in the valve closed position as shown in FIG. 2. In a non-vertical orientation, the clapper shaft in prior valves is not always maintained horizontal and transverse to the longitudinal axis of the valve with consequences such that the clapper may not effect a seal in the valve closed position.

To avoid this problem, the valve body of the valve 10 is provided with raised surfaces guide or ribs 40 to guide the valve clapper throughout its range of swinging movement, particularly when the valve is non-vertical and thereby insure that the clapper is disposed to close in a sealing manner with the valve seal mounted in the tailpiece end surface. As seen in FIG. 2, guide ribs 40 are formed on the inner walls of the valve chamber on opposite sides of the flow passage. In the closed position of the valve clapper, the guide ribs are at diametrically opposed positions relative to the circular peripheral edge of the valve clapper and at a diameter thereof which is horizontal when the valve is vertical. Each guide rib 40 extends in the direction of swinging movement of the clapper towards its valve open position and describes a circular arc with a center of curvature coincident with the axis of the clapper shaft. When the valve is in the vertical orientation, the clearance is tightly controlled between each guide rib and the circular edge of the valve clapper throughout its range of swinging movement. Should the valve be in a non-vertical orientation, the valve clapper may contact one of the guide ribs 40 and be guided thereby in moving between its valve open and valve closed position. Because of the contacting guide rib, the valve clapper is disposed to make sealing engagement with the planar valve sealing surface.

While the problem of misalignment of the valve clapper in non-vertical orientation of swing check valves has heretofore been recognized, the frusto-conical sealing surfaces typically provided for the valve clapper and valve seal in prior conventional swing check valves severely reduces the probability of an effective seal for the valve clapper when in its valve closed position. On the other hand, the planar sealing surface 23 on the end of the tailpiece of the valve of the present invention in cooperation with the guide ribs 40 assures a seal with practical certainty, even in the event, the clapper shaft 28 is not maintained strictly transverse to the valve longitudinal axis because of tolerances.

It is also to be appreciated that in the valve of the present invention, the valve sealing surface 23 is mounted in the valve body in the tailpiece section thereof and is in a location removed from the direct flow through the valve. It is therefore protected from erosion due to flow through the valve.

Further, the provision of the valve sealing surface on the end of the tailpiece, which can be easily removed in disassembly of the valve, makes it very easy to refurbish or upgrade the valve sealing surface with a more corrosion resistant face or harder surfaces.

It is to be further noted that the unique construction of the valve of the present invention is such that the clapper is restrained in its operative position by the two body parts as mated in the valve assembly. The valve has no bonnet, body openings or lateral threaded connections which might leak.

It is also to be understood that the foregoing description of the invention has been presented for purposes of illustration and explanation and is not intended to limit the invention to the precise form disclosed. The valve body and valve chamber, for example, might have a transverse cross section other than ovate or elliptical, and the valve body materials can be of any suitable material such as steel or bronze. It is to be appreciated therefore that various structural changes may be made and various materials used in the valve construction by those skilled in the art without departing from the spirit of the invention.

We claim:

1. A bonnetless check valve comprising a valve body having a valve chamber and valve inlet and valve outlet ports communicating with said valve chamber to define a flow passage through said valve, said valve body being formed of first and second body members wherein said first body provides said valve chamber and said valve outlet port and said second body member has an end portion threadedly joined to said first body member and extending into said valve chamber, said second body member having a bore opening therethrough extending from said valve inlet port through said end portion;

a valve sealing surface provided on the end of said second body member which extends into the valve chamber, said valve sealing surface having an annular planar configuration in surrounding relation to said flow passage and in a normally protected position with respect to the flow of fluid through the valve;

a valve clapper element;

a clapper shaft connected to said clapper element by a clapper arm, said valve chamber having walls defining said valve chamber being provided with slots formed in said walls at opposite sides of the valve flow passage and adapted to receive the end portions of the clapper shaft therein, said shaft being axially rotatable, supported on said end portion of the second body member and restrained by said joined body members whereby said valve clapper element is pivotally moveable in the valve chamber between a first valve closed position wherein the clapper element closes the flow passage and a second valve open position wherein the clapper element is in an unobstructing position with respect to the flow passage.

2. A check valve as set forth in claim 1 further including guide ribs formed on the inner wall of the valve chamber closely adjacent the periphery of said valve clapper at opposite sides of the flow passage, each said guide rib extending in an arc substantially co-extensive with the arc of swinging movement of said valve clapper when moving from the valve open to the valve closed position whereby said valve clapper is maintained in operational alignment with said valve seat and is disposed to effect a seal therewith when in the valve closed position.

3. A check valve as set forth in claim 2 further including a compressible spring mounted on the valve clapper on the surface thereof which faces the outlet port when in the valve closed position, said spring adapted to engage the wall of the valve chamber and to be compressed thereagainst when the clapper is in the valve open position to thereby bias the clapper towards the valve closed position in counteraction to flow through the valve.

4. A check valve as set forth in claim 3 wherein said spring has a pair of ends which are fixed to the valve clapper and a central section which is angularly disposed with respect to the back surface of the clapper and is adapted to engage the wall of the valve chamber when the clapper is in the valve open position.

5. A check valve comprising a valve body having a valve chamber therein and inlet and outlet ports communicating with said chamber to define a flow passage through said valve, said valve body being formed of two threadedly joined body members wherein one of said body members provides said valve chamber and said outlet port, the other of said body members provides said inlet port and has an end portion which extends into said valve chamber;

a valve seat located in the valve chamber and comprising a valve sealing surface in surrounding relation to said flow passage, said valve sealing surface facing towards the outlet port of the valve;

a valve clapper element;

a clapper shaft connected to said clapper element by a clapper arm extending substantially perpendicularly from the periphery thereof, said valve chamber having walls defining said valve chamber being provided with slots formed in said walls at opposite sides of the valve flow passage and sized to receive the end portions of the clapper shaft therein, said shaft being axially rotatable, supportable atop said end portion and restrained by said joined body members whereby said valve clapper element is pivotally moveable in the valve chamber between a first valve closed position wherein the clapper element closes the flow passage and a second valve open position wherein the clapper element is in an unobstructing position with respect to the flow passage; and guide ribs formed on the inner wall of the valve chamber closely adjacent the periphery of said valve clapper at opposite sides of the flow passage, each said guide rib extending in an arc substantially co-extensive with the arc of swinging movement of said valve clapper when moving from the valve open to the valve closed position whereby said valve clapper is maintained in operational alignment with said valve seat and is disposed to effect a seal therewith when in the valve closed position.

6. A valve as set forth in claim 4 wherein said valve sealing surface is of annular planar configuration and said clapper element is of disc-like configuration and is provided with a planar sealing surface adapted for cooperative sealing engagement with said planar valve sealing surface.

* * * * *